United States Patent
Zamer

(10) Patent No.: US 6,944,733 B2
(45) Date of Patent: Sep. 13, 2005

(54) DATA STORAGE USING WIRELESS COMMUNICATION

(75) Inventor: Ahmad H. Zamer, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 10/317,606

(22) Filed: Dec. 11, 2002

(65) Prior Publication Data

US 2004/0117548 A1 Jun. 17, 2004

(51) Int. Cl.[7] .............................................. G06F 12/06
(52) U.S. Cl. ........................ 711/162; 711/112; 711/170
(58) Field of Search ........................ 711/111, 112, 114, 711/170, 162; 703/203, 202, 212, 217, 219, 216

(56) References Cited

U.S. PATENT DOCUMENTS

| | | |
|---|---|---|
| 4,870,643 A | 9/1989 | Bultman et al. |
| 5,088,081 A | 2/1992 | Farr |
| 5,191,584 A | 3/1993 | Anderson |
| 5,367,669 A | 11/1994 | Holland et al. |
| 5,761,460 A | 6/1998 | Santos et al. |
| 6,044,444 A * | 3/2000 | Ofek .......................... 711/162 |
| 6,122,750 A | 9/2000 | Hayasaka |
| 6,137,679 A | 10/2000 | Chang |
| 6,223,217 B1 * | 4/2001 | Pettus ......................... 709/219 |
| 6,370,604 B1 | 4/2002 | Sreekanti |
| 6,473,849 B1 * | 10/2002 | Keller et al. ................ 709/226 |
| 6,772,303 B2 * | 8/2004 | Crockett et al. ............ 711/162 |
| 2002/0083111 A1 * | 6/2002 | Row et al. ...................... 709/1 |
| 2003/0126200 A1 * | 7/2003 | Wolff .......................... 709/203 |
| 2004/0039959 A1 * | 2/2004 | LeCrone et al. ................ 714/6 |

OTHER PUBLICATIONS

Al–Mouhamed, Transaction of Parallel and Dsitributed Systems, Analysis of Macro–Dataflow Dynamic Scheduling on Nonuniform Memory Access Architectures, vol. 4, No. 8, pp. 875–888, Aug. 1993.*

Nowatzk, A., et al., Parallel Computing: Trends and Applications, Exploiting Parallelism in Cache Coherency Protocol Engines, Grenoble France, pp. 269–286, Sep. 1993.*

Alan F. Benner, "Fibre Channel Gigabit Communications and I/O for Computer Networks", McGraw Hill, 1996, Chapters 6–8 pps. 93–162, Chapter 12 pps 219–243, and Chapter 17 pps. 310–317.

Julian Satran et al., "IP Storage Working Group Internet Draft", Catergory: Standards–track, draft–ietf–ips–iscsi–19. txt, Nov. 3, 2002, pps 1–291.

* cited by examiner

Primary Examiner—Pierre-Michel Bataille
(74) Attorney, Agent, or Firm—Christopher K. Gagne

(57) ABSTRACT

In one embodiment, a method is provided. The method of this embodiment may include issuing from first circuitry to second circuitry, and/or receiving by the second circuitry of, a request to initiate performance of at least one input/output (I/O) operation of at least one type involving, at least in part, the second circuitry. The second circuitry may be remote from the first circuitry and may be disabled from initiating performance of any I/O operation of the at least one type involving the first circuitry. The second circuitry may be capable of, in response, at least in part, to receipt of the request, performing, at least in part, the at least one I/O operation involving, at least in part, the second circuitry. Of course, many modifications, variations, and alternatives are possible without departing from this embodiment.

19 Claims, 4 Drawing Sheets

DATA STORAGE USING WIRELESS COMMUNICATION

FIELD

This application relates to data storage.

BACKGROUND

In a network data backup technique, a redundant copy of data stored in nodes in the network may be made. The redundant copy may be stored in a redundant storage system in the network. In the event that data stored in the nodes becomes lost and/or corrupted, it may be possible to perform a network data recovery operation to recover the lost and/or corrupted data from the redundant copy in the redundant storage system. Typically, the nodes and the redundant storage system in the network are coupled together via network communication links that utilize, as network communication media, network cabling.

Unless the coherency and security of the redundant copy are maintained, it is possible that the redundant copy may become lost and/or corrupted. If this occurs, it may not be possible to recover meaningful data from the redundant copy. Additionally, the use of network cabling, as the network communication media in the network, limits the mobility of the nodes and redundant storage. Also, certain types of devices that possibly could be used as nodes in the network derive utility from being able to communicate wirelessly. If these types of devices are coupled to network cabling in order to facilitate backup and recovery operations, the utility of these types of devices may be reduced.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
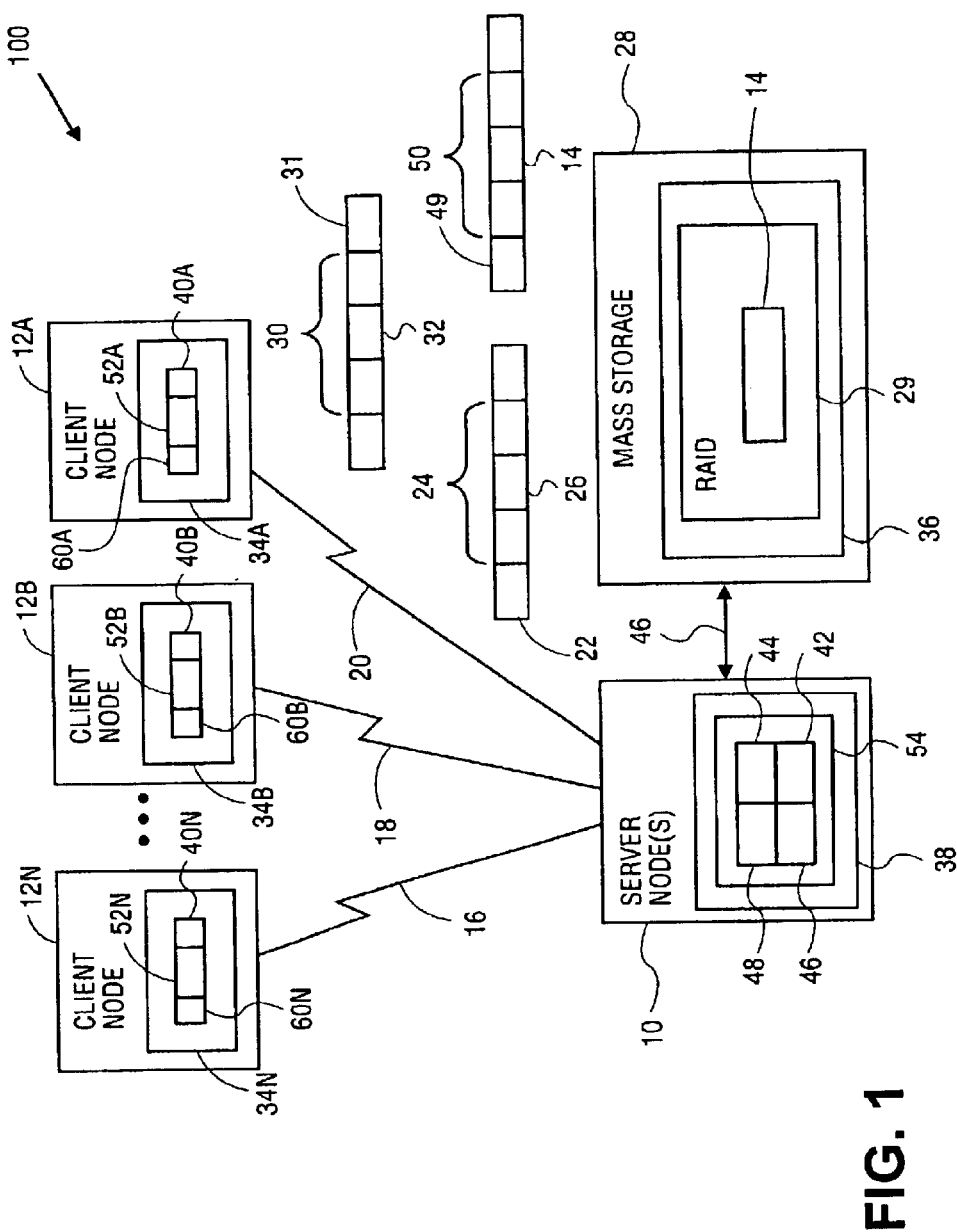
FIG. 1 illustrates a system embodiment.

FIG. 1 is a diagram of a system embodiment 100. System 100 may include, e.g., a plurality of client computer nodes 12A, 12B, . . . 12N and at least one server computer node (collectively or singly referred to herein as "server node 10"). A plurality of wireless network communication links may communicatively couple client nodes 12A, 12B, . . . 12N to server node 10, and although not shown in FIG. 1, also may communicatively couple client nodes 12A, 12B, . . . 12N to each hat are electrically coupled to a communications network 120, such that client nodes 12A, 12B, . . . 12N may exchange data and/or commands among each other and server node 10 using these links. For example, one or more respective wireless network communication links 16, 18, and 20 may communicatively couple client nodes 12N, 12B, and 12A with server node 10 such that client nodes 12A, 12B, and 12N may exchange data and/or commands with server node 10 in the manner described below.

The respective numbers of client nodes 12A, 12B, . . . 12N and server computer nodes that may be comprised in server node 10 may vary without departing from this embodiment. Additionally, without departing from this embodiment, the respective numbers of client nodes 12A, 12B, . . . 12N may be different from the respective number of server nodes comprised in server node 10.

Server node 10, and each of the client computer nodes 12A, 12B, . . . 12N, may comprise operative circuitry 38, and 34A, 34B, . . . 34N, respectively, that may comprise respective computer-readable memory that may store software programs, program instructions, and data structures (collectively or singly referred by numerals 54, and 52A, 52B, . . . 52N, respectively), including respective network communication protocol programs, and data structures, associated with, and for carrying out the operations and/or functions described herein as being carried out by operative circuitry 38 in server node 10 and operative circuitry 34A, 34B, . . . 34N in client computer nodes 12A, 12B, . . . 12N, respectively. The execution of such software programs and/or manipulation of such data structures 54, and 52A, 52B, . . . 52N by such respective operative circuitry 38 and 34A, 34B, . . . 34N, respectively, may result in server node 10 and client computer nodes 12A, 12B, . . . 12N carrying out the operations and/or functions described herein as being carried out by server node 10 and client computer nodes 12A, 12B, . . . 12N, respectively.

In this embodiment, each of the wireless network communication links in system 100 may utilize one or more network communication protocols, such as, for example, wireless Ethernet protocol, transmission control protocol/internet protocol (TCP/IP), and/or iSCSI protocol. For example, network links 16, 18, and 20 may permit operative circuitry 34N, 34B, and 34A in client nodes 12N, 12B, and 12A, respectively, to exchange packets and/or frames, in compliance or compatible with one or more such protocols, with operative circuitry 38 in server node 10. As is described below, these packets and/or frames may comprise messages that may include requests and/or data. However, without departing from this embodiment, network links 16, 18, and/or 20 may utilize one or more non-wireless network communication protocols.

If a wireless Ethernet protocol is utilized by links 16, 18, and 20 in system 100, it may be compliant or compatible with the protocol described in Institute of Electrical and Electronics Engineers, Inc. (IEEE) Std. 802.11a-1999, published 1999, or with the protocol described in IEEE Std. 802.11b-1999, published 1999. If TCP/IP is utilized by links 16, 18, and 20 in system 100, it may be compliant or compatible with the protocols described in Internet Engineering Task Force (IETF) Request For Comments (RFC) 791 and 793, published September 1981. If an iSCSI protocol is utilized by links 16, 18, and 20 in system 100, it may be compliant or compatible with the protocol described in Satran, "iSCSI," Internet-Draft Specification, draft-ietf-ips-iscsi-19, IP Storage Working Group of the Internet Engineering Task Force, published Nov. 3, 2002, by the Internet Engineering Task Force, Internet Engineering Task Force Secretariat c/o Corporation for National Research Initiatives, 1895 Preston White Drive, Suite 100, Reston, Va. 20191, United States of America (hereinafter referred to as the "iSCSI Specification"). Of course, other protocols may be additionally and/or alternatively used by network communication links 16, 18, and 20, and/or by other communication links in system 100, without departing from this embodiment.

Server node 10 may be electrically coupled to mass storage 28 via one or more network communication links 46. Mass storage 28 may comprise operative circuitry 36 that may include one or more sets of one or more magnetic disk, optical disk, solid-state, and/or semiconductor mass storage devices (not shown) that may comprise, for example, redundant array of inexpensive disks (RAID) 29. One or more network communication links 46 may utilize one or more network communication protocols of the type described above; alternatively or additionally, one or more network communication links 46 may utilize one or more other protocols, such as, for example, a non-wireless Ethernet protocol, Serial Advanced Technology Attachment (S-ATA), Small Computer Systems Interface (SCSI), and/or Fibre Channel (FC) protocol. For example, one or more network links 46 may permit operative circuitry 38 in server node 10 to exchange packets and/or frames, in compliance or compatible with one or more of these network protocols, with operative circuitry 36 in mass storage 28. These packets and/or frames may comprise messages that may include requests and/or data. By exchanging such packets and/or frames with circuitry 36, circuitry 38 may control and/or monitor operation of circuitry 36 in mass storage 28. In this embodiment, each of the nodes 10, 12A, 12B, . . . 12N, and mass storage 28, may be geographically remote from each other.

If a non-wireless Ethernet protocol is utilized by one or more links 46, it may be compliant and/or compatible with the protocol described in IEEE Std. 802.3, 2000 Edition, published on Oct. 20, 2000. If an S-ATA protocol is used by one or more links 46, it may comply or be compatible with the protocol described in "Serial ATA: High Speed Serialized AT Attachment," Revision 1.0, published on Aug. 29, 2001 by the Serial ATA Working Group. If a SCSI protocol is utilized by one or more links 46, it may comply or be compatible with the interface/protocol described in American National Standards Institute (ANSI) Small Computer Systems Interface-2 (SCSI-2) ANSI X3.131-1994 Specification. If an FC protocol is utilized by one or more links 46, it may be compliant and/or compatible with the protocol described in ANSI Standard Fibre Channel (FC) Physical and Signaling Interface-3 X3.303:1998 Specification. Of course, other network communication protocols may be utilized by one or more links 46 without departing from this embodiment. As is known to those skilled in the art, certain protocols, such as, for example, iSCSI, FC, SCSI, and S-ATA protocols, are "block-based protocols" in that they may define a data transfer in terms of one or more blocks (i.e., fixed sized units) of data being transferred.

In this embodiment, the respective constructions of operative circuitry 34A, 34B, . . . 34N in client nodes 12A, 12B, . . . 12N, respectively, may be substantially identical. However, alternatively, without departing from this embodiment, the respective constructions of operative circuitry 34A, 34B, . . . 34N in client nodes 12A, 12B, . . . 12N, respectively, may be different from each other.

Figure 2:
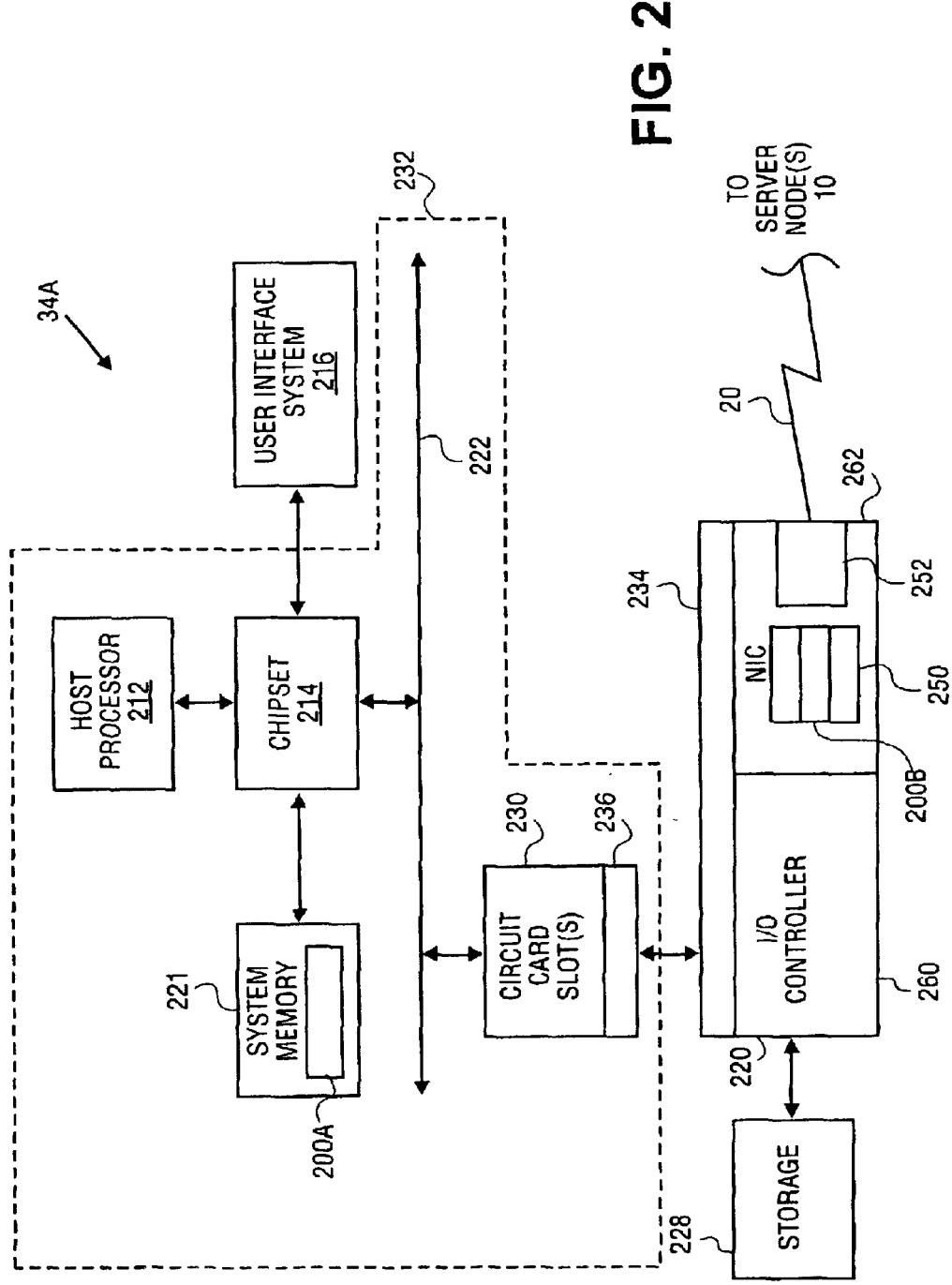
FIG. 2 illustrates in greater detail a client node in the system embodiment of FIG. 1.

FIG. 2 illustrates operative circuitry 34A according to one embodiment. Circuitry 34A may include a host processor 212 coupled to a chipset 214. Host processor 212 may comprise, for example, an Intel® Pentium® III or IV microprocessor that is commercially available from the Assignee of the subject application. Of course, alternatively, host processor 212 may comprise another type of microprocessor, such as, for example, a microprocessor that is manufactured and/or commercially available from a source other than the Assignee of the subject application, without departing from this embodiment.

Chipset 214 may comprise a host bridge/hub system that may couple host processor 212, a system memory 221 and a user interface system 216 to each other and to a bus system 222. Chipset 214 may also include an input/output (I/O) bridge/hub system (not shown) that may couple the host bridge/bus system to bus 222. Chipset 214 may comprise integrated circuit chips, such as those selected from integrated circuit chipsets commercially available from the Assignee of the subject application (e.g., graphics memory and I/O controller hub chipsets), although other integrated circuit chips may also, or alternatively be used, without departing from this embodiment. User interface system 216 may comprise, e.g., a keyboard, pointing device, and display system that may permit a human user to input commands to, and monitor the operation of, circuitry 34A.

Bus 222 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, bus 222 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 222 may comprise other types and configurations of bus systems, without departing from this embodiment.

Circuitry 34A also may comprise one or more circuit card slot 230. One or more circuit card slots 230 may comprise one or more PCI expansion slots that may comprise one or more respective PCI bus connectors 236. One or more connectors 236 may be electrically and mechanically mated with one or more respective PCI bus connectors 234 that are comprised in one or more circuit cards 220. One or more circuit cards 220 also may comprise respective operative circuitry that may comprise one or more respective processors (not shown, e.g., one or more respective Intel® Pentium® III or IV microprocessors) and respective computer-readable memory (for example, memory 250 comprised in network interface controller (NIC) 262). This respective computer-readable memory 250 and system memory 221 each may comprise one or more of the following types of computer-readable memories: semiconductor firmware memory, programmable memory, non-volatile memory, read only memory, electrically programmable memory, random access memory, flash memory, magnetic disk memory, and/or optical disk memory. Either additionally or alternatively, memory 250 and 221 each may comprise other and/or later-developed types of computer-readable memory. Also either additionally or alternatively, these one or more respective processors may comprise integrated circuit chips (not shown) comprised in an integrated circuit chipset, such as those commercially available from the Assignee of the subject application (e.g., the Intel® 80310 Chipset. Further additionally or alternatively, these one or more processors may comprise other integrated circuit chips (e.g., the Intel® 80960 RM/RN I/O processor, the Intel® 80321 processor, and/or other types of processors that are available from sources other than the Assignee of the subject application), or other types of processors/integrated circuits without departing from this embodiment.

The operative circuitry of one or more circuit cards 220 may comprise I/O controller 260 and NIC 262. I/O controller 260 may be coupled to and control the operation of a set of one or more magnetic disk, optical disk, solid-state, and/or semiconductor storage devices (hereinafter collectively or singly referred to as "storage 228"). In this embodiment, storage 228 may comprise, e.g., volatile and/or non-volatile storage that may be used to store, for example, user data that may be accessed locally by a not shown human user of client node 12A by, for example, issuing appropriate commands to circuitry 34A via interface system 216.

NIC 262 may comprise transmit and receive circuitry 252 that may generate, issue, receive, and/or decode one or more packets and/or frames via which commands and/or data may be exchanged with server node 10 using link 20. For example, as is described more fully below, circuitry 252 in NIC 262 may receive and decode, one or more frames (collectively or singly referred to by numeral 22 in FIG. 1) and/or one or more frames (collectively or singly referred to by numeral 49 in FIG. 1) that may be issued from circuitry 38 to circuitry 252 via link 20. Circuitry 252 in NIC 262 also may generate and issue one or more frames (collectively or singly referred to by numeral 31 in FIG. 1) to circuitry 38 via link 20.

Processor 212, system memory 221, chipset 214, PCI bus 222, and one or more circuit card slots 230 may be comprised in a single circuit board, such as, for example, a system motherboard 232. Depending upon, for example, the particular storage that may be comprised in storage 228, storage 228 may be comprised in the same enclosure in which motherboard 232 and the components comprised in the motherboard 232 are enclosed. Additionally, if, for example, storage 228 comprises semiconductor memory, this semiconductor memory may be comprised in motherboard 232.

Respective subsets 200A and 200B of computer program processes and machine-executable program instructions 52A may be comprised in e.g., system memory 221 and NIC memory 250. The precise processes and program instructions that may be comprised in subsets 200A and 200B may vary without departing from this embodiment. In this embodiment, the program instructions comprised in each respective subset 200A and 200B, may be accessed and executed by, for example, processor 212 and one or more not shown processors comprised in NIC 262, respectively; when executed by these processors, these instructions may result in circuitry 34A, NIC 262, and/or circuitry 252 performing the respective operations described herein as being performed by circuitry 34A, NIC 262, and/or circuitry 252.

One or more slots 230 and one or more cards 220 may be constructed to permit one or more cards 220 to be inserted into one or more respective slots 230. When one or more cards 220 are properly inserted into one or more respective slots 230, one or more connectors 234 may become electrically and mechanically coupled to one or more respective connectors 236. When one or more connectors 234 are so coupled to one or more respective connectors 236, one or more cards 220 may become electrically coupled to bus 222.

The operative circuitry described herein as being comprised in one or more circuit cards 220, may not be comprised in one or more cards 220, but instead, without departing from this embodiment, may be comprised in other structures, systems, and/or devices that may be, for example, comprised in motherboard 232, coupled to bus 222, and exchange data and/or commands with other components in circuitry 34A.

Figure 3:
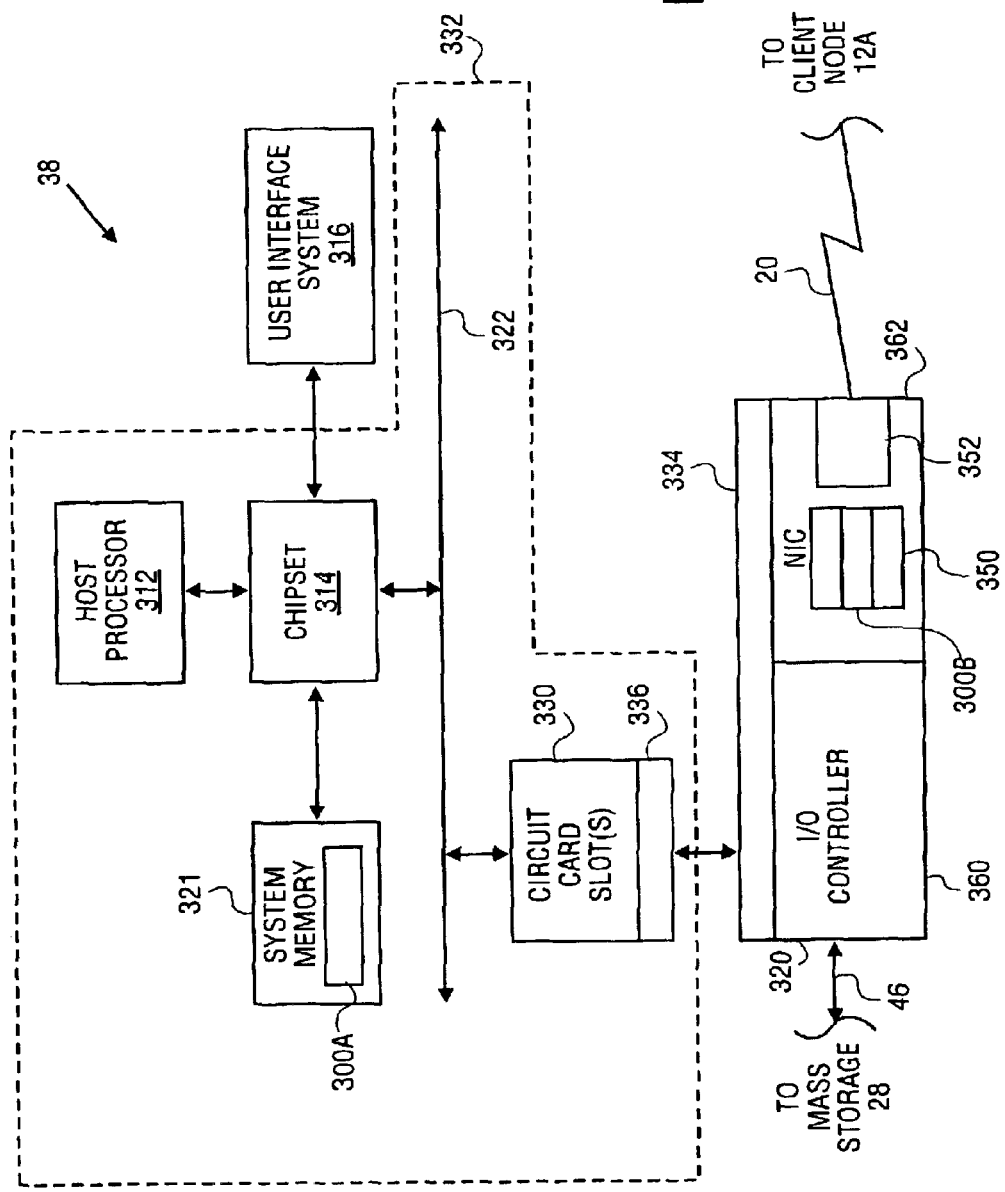
FIG. 3 illustrates in greater detail a storage system in the system embodiment of FIG. 1.

FIG. 3 illustrates operative circuitry 38 according to one embodiment. Circuitry 38 may include a host processor 312 coupled to a chipset 314. Host processor 312 may comprise, for example, an Intel® Pentium® III or IV microprocessor that is commercially available from the Assignee of the subject application. Of course, alternatively, host processor 312 may comprise another type of microprocessor, such as, for example, a microprocessor that is manufactured and/or commercially available from a source other than the Assignee of the subject application, without departing from this embodiment.

Chipset 314 may comprise a host bridge/hub system that may couple host processor 312, a system memory 321 and a user interface system 316 to each other and to a bus system 322. Chipset 314 may also include an input/output (I/O) bridge/hub system (not shown) that may couple the host bridge/bus system to bus 322. Chipset 314 may comprise integrated circuit chips, such as those selected from integrated circuit chipsets commercially available from the Assignee of the subject application (e.g., graphics memory and I/O controller hub chipsets), although other integrated circuit chips may also, or alternatively be used, without departing from this embodiment. User interface system 316 may comprise, e.g., a keyboard, pointing device, and display system that may permit a human user to input commands to, and monitor the operation of, circuitry 38.

Bus 322 may comprise a PCI bus. Alternatively, bus 322 instead may comprise a PCI-X bus. Also alternatively, bus 322 may comprise other types and configurations of bus systems, without departing from this embodiment.

Circuitry 38 also may comprise one or more circuit card slots 330. One or more circuit card slots 330 may comprise one or more PCI expansion slots that may comprise one or more respective PCI bus connectors 336. One or more connectors 336 may be electrically and mechanically mated with one or more respective PCI bus connectors 334 that are comprised in one or more circuit cards 320. One or more circuit cards 320 also may comprise respective operative circuitry that may comprise one or more respective processors (not shown, e.g., one or more respective Intel® Pentium® III or IV microprocessors) and respective computer-readable memory (for example, memory 350 comprised in one or more network interface controllers 362). This respective computer-readable memory 350 and system memory 321 each may comprise one or more of the following types of computer-readable memories: semiconductor firmware memory, programmable memory, non-volatile memory, read only memory, electrically programmable memory, random access memory, flash memory, magnetic disk memory, and/or optical disk memory. Either additionally or alternatively, memory 350 and 321 each may comprise other and/or later-developed types of computer-readable memory. Also either additionally or alternatively, these one or more respective processors may comprise integrated circuit chips (not shown) comprised in an integrated circuit chipset, such as those commercially available from the Assignee of the subject application (e.g., the Intel® 80310 Chipset. Further additionally or alternatively, these one or more processors may comprise other integrated circuit chips (e.g., the Intel® 80960 RM/RN I/O processor, the Intel® 80321 processor, and/or other types of processors that are available from sources other than the Assignee of the subject application), or other types of processors/integrated circuits without departing from this embodiment.

The operative circuitry of one or more circuit cards 320 may comprise one or more I/O controllers 360 and one or more network interface controllers 362. One or more I/O controllers 360 may be coupled to and control the operation of operative circuitry 36 of mass storage 28. Although not shown in FIG. 3, operative circuitry 38 also may comprise local storage that may comprise, e.g., volatile and/or non-volatile storage that may be used to store, for example, user data that may be accessed locally by a not shown human user of server node 10 by, for example, issuing appropriate commands to circuitry 38 via interface system 316. This local storage also may be controlled by one or more I/O controllers 360.

One or more network interface controllers 362 may comprise transmit and receive circuitry 352 that may generate, issue, receive, and/or decode one or more packets and/or frames via which commands and/or data may be exchanged with client nodes 12A, 12B, . . . 12N using the wireless network communication links. Although only one link 20 is shown in FIG. 3, circuitry 352 may generate, issue, receive, and/or decode one or more packets and/or frames via which commands and/or data may be exchanged with client nodes 12A, 12B, and 12N using wireless network communication links 20, 18, and 16, respectively. As is described more fully below, circuitry 352 may receive and decode, one or more frames 31 that may be issued to circuitry 352 from circuitry 34A via link 20. Additionally, circuitry 352 may generate and issue to circuitry 34A one or more frames 22 and/or one or more frames 48 via link 20.

Processor 312, system memory 321, chipset 314, PCI bus 322, and one or more circuit card slots 330 may be comprised in a single circuit board, such as, for example, a system motherboard 332. Respective subsets 300A and 300B of computer program processes and machine-executable program instructions 54 may be comprised in e.g., system memory 321 and memory 350. The precise processes and program instructions that may be comprised in subsets 300A and 300B may vary without departing from this embodiment. In this embodiment, the program instructions comprised in each respective subset 300A and 300B, may be accessed and executed by, for example, processor 312 and one or more not shown processors comprised in one or more network interface controllers 362; when executed by these processors, these instructions may result in circuitry 38, one or more network interface controllers 362, and/or circuitry 352 performing the respective operations described herein as being performed by circuitry 38, one or more network interface controllers 362, and/or circuitry 352.

One or more slots 330 and one or more cards 320 may be constructed to permit one or more cards 320 to be inserted into one or more respective slots 330. When one or more cards 320 are properly inserted into one or more respective slots 330, one or more connectors 334 may become electrically and mechanically coupled to one or more respective connectors 336. When one or more connectors 334 are so coupled to one or more respective connectors 336, one or more cards 320 may become electrically coupled to bus 322.

The operative circuitry described herein as being comprised in one or more circuit cards 320, may not be comprised in one or more cards 320, but instead, without departing from this embodiment, may be comprised in other structures, systems, and/or devices that may be, for example, comprised in motherboard 332, coupled to bus 322, and exchange data and/or commands with other components in circuitry 38.

As stated previously, the execution of software programs, instructions, and/or manipulation of such data structures 54, and 52A, 52B, . . . 52N by such respective operative circuitry 38 and 34A, 34B, . . . 34N, respectively, may result in server node 10 and client computer nodes 12A, 12B, . . . 12N carrying out the respective operations and/or functions described herein as being carried out by server node 10 and client computer nodes 12A, 12B, . . . 12N, respectively. These and other operations 400 that may be carried out in system 100 in accordance with one embodiment, will now be described with reference to FIG. 4.

After, for example, a reset of client nodes 12A, 12B, . . . 12N and server node 10, operative circuitry 34A, 34B, . . . 34N in client nodes 12A, 12B, . . . 12N, and operative circuitry 38 in server node 10 may execute one or more respective sets of program instructions comprised in, e.g., software programs, program instructions, and data structures 52A, 52B, . . . 52N, and 54, respectively. The execution of these one or more respective sets of program instructions by operative circuitry 34A, 34B, . . . 34N may result in execution of respective program processes 60A, 60B, . . . 60N. The execution of these program processes 60A, 60B, . . . 60N may result in, e.g., the loading into the respective system memory and/or NIC memory comprised in respective operative circuitry 34A, 34B, . . . 34N, and execution by such respective operative circuitry of, respective I/O target agents 40A, 40B, . . . 40N. Respective I/O target agents 40A, 40B, . . . 40N may be capable of initiating performance, at least in part, by operative circuitry 34A, 34B, . . . 34N, respectively, of one or more I/O operations and/or transactions of one or more predetermined types. I/O target agents 40A, 40B, . . . 40N may initiate such performance in response, at least in part, to receipt of one or more requests to initiate such performance that may be generated by and/or issued from, for example, one or more I/O initiator agents and/or operative circuitry located remotely from, respectively, the respective I/O target agents 40A, 40B, . . . 40N. For example, I/O target agents 40A, 40B, . . . 40N may comprise respective iSCSI protocol target agents that may initiate performance by operative circuitry 34A, 34B, . . . 34N, respectively, of one or more iSCSI protocol I/O operations and/or transactions to facilitate and/or carry out one or more data backup and/or recovery operations and/or transaction requested by, e.g., an iSCSI protocol initiator agent 42 resident in and/or executed by operative circuitry 38 in server node 10, in compliance and/or compatible with the iSCSI Specification.

In this embodiment, operative circuitry 34A, 34B, . . . 34N in nodes 12A, 12B, . . . 12N may be disabled from initiating the performance by circuitry 38 in server node 10 of any I/O transaction and/or operation of the one or more predetermined types. For example, in this embodiment, the execution of the respective sets of program instructions comprised in respective software programs, program instructions, and data structures 52A, 52B, . . . 52N may not result in loading into and/or execution by operative circuitry 34A, 34B, . . . 34N of any initiator agents capable of initiating the performance by circuitry 38 in server node 10 of any I/O transaction and/or operation of the one or more predetermined types. This may result in such initiator agents being absent from and/or not executed by operative circuitry 34A, 34B, . . . 34N. Conversely, as stated previously, the execution of the respective sets of program instructions comprised in respective software programs, program instructions, and data structures 52A, 52B, . . . 52N may result in loading into and/or execution by operative circuitry 34A, 34B, . . . 34N, respectively, of respective target agents 40A, 40B, . . . 40N. Also conversely, the execution by operative circuitry 38 of program instructions comprised in respective software programs, program instructions, and data structures 54 may result in the loading into and/or execution by operative circuitry 38 of initiator agent 42. As a result, operative circuitry 34A, 34B, . . . 34N may be enabled to initiate performance, at least in part, by operative circuitry 34A, 34B, . . . 34N, respectively, of one or more I/O transactions and/or operations of the one or more predetermined types involving operative circuitry 34A, 34B, . . . 34N requested by initiator agent 42 in operative circuitry 38, but operative circuitry 34A, 34B, . . . 34N may be disabled from initiating and/or requesting the initiation of performance of any I/O transaction and/or operation of the one or more predetermined types involving circuitry 38. Conversely, this also may result in circuitry 38 being capable of generating and issuing to circuitry 34A, 34B, . . . 34N (e.g., via one or more respective wireless communication links in system 100) one or more respective requests to initiate the performance of one or more I/O transactions and/or operations of the one or more predetermined types involving such circuitry 34A, 34B, . . . 34N. In response, at least in part, to receipt of one or more such respective requests by operative circuitry 34A, 34B, . . . 34N, respectively, operative circuitry 34A, 34B, . . . 34N, respectively, may perform, at least in part, the one or more I/O transactions and/or operations requested in the one or more respective requests.

For example, in this embodiment, the execution by operative circuitry 38 of program instructions comprised in respective software programs, program instructions, and data structures 54 may result in the loading into and/or execution by operative circuitry 38 of a backup and/or recovery agent (collectively or singly referred to as "backup agent 46" in FIG. 1) and one or more backup and/or recovery processes (collectively or singly referred to as "backup processes 48" in FIG. 1). Backup agent 46 and/or backup processes 48 may be comprised in portion 300A and/or portion 300B and may be executed by host processor 312 and/or one or more not shown processors in one or more network interface controllers 362. As a result of executing backup agent 46 and/or backup processes 48, a human user (not shown) of circuitry 38 may be permitting to issue to operative circuitry 38 via user interface system 316 a command to perform, for example, one or more data backup and/or recovery operations involving client node 12A. After such a command has been issued to circuitry 38, backup agent 46 and/or backup processes 48 may receive the command. In response, at least in part, to receipt of the command, backup agent 46 and/or backup processes 48 may signal initiator agent 42 to initiate the performance of the data backup and/or recovery operation commanded by the user.

Figure 4:
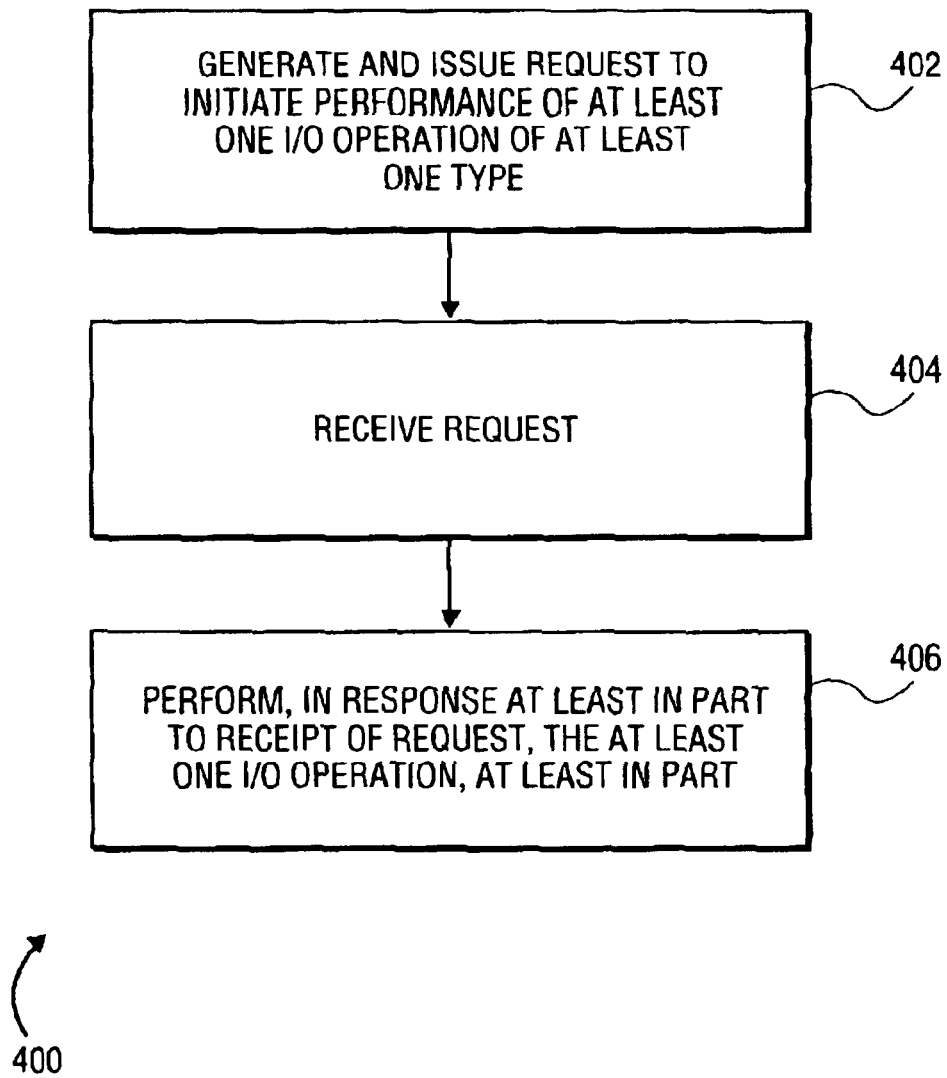
FIG. 4 is a flowchart illustrating operations that may be performed according to one embodiment.

For example, with particular reference now being made to FIG. 4, in response, at least in part to this signaling of initiator agent 42 by backup processes 48 and/or backup agent 48, initiator agent 42 may signal one or more network interface controllers 362. This may result in one or more network interface controllers 362 generating and issuing to NIC 262 a request 26 to initiate performance of at least one I/O operation and/or transaction of at least one predetermined type involving circuitry 34A, as illustrated by operation 402 in FIG. 4. The at least one predetermined type of this at least I/O operation and/or transaction may be selected such that the at least one I/O operation and/or transaction may be comprised in, facilitate, and/or carry out, at least in part, the commanded backup and/or recovery operation. Request 26 may be encoded as, for example, one or more values comprised in one or more fields comprised in one or more packets (collectively or singly referred to as "packet 22" in FIG. 1) that may comply and/or be compatible with the iSCSI Specification. Packet 22 may be comprised in one or more frames (collectively or singly referred to as "frame 22" in FIG. 1) that, as a result of operation 402, may be generated by and issued from one or more network interface controllers 362 to NIC 262 via link 20.

NIC 262 may receive via link 20 request 26 in frame 22, as illustrated by operation 404 in FIG. 4. NIC 262 may parse frame 22 to retrieve request 26. Target agent 40A may examine request 26 and may determine therefrom the at least one I/O transaction and/or operation being requested by request 26. In response, at least in part, to the receipt of request 26, and/or based, at least in part, upon the at least one I/O transaction and/or operation that agent 40A determines is being requested by request 26, target agent 40A may signal operative circuitry 260 to perform, at least in part, the at least one I/O transaction and/or operation being requested by request 26; this may result in operative circuitry 34A performing, at least in part, this at least one I/O transaction and/or operation, as illustrated by operation 406 in FIG. 4.

For example, as part of operation 406, if the at least one I/O transaction and/or operation requested by request 26 is comprised in, facilitates, and/or may be used to carry out, at least in part, a data backup operation, the signaling by target agent 40A of operative circuitry 260 may result in the I/O controller comprised in operative circuitry 260 retrieving from local storage 228 data that is intended to be backed up (e.g., copied) to redundant storage in RAID 29. For example, in accordance with the command issued by the human user to backup agent 46 and/or backup processes 48, request 26 may specify and/or indicate the data in local storage 228 that is to be copied to such redundant storage in RAID 29. As part of operation 406, the I/O controller in operative circuitry 260 may provide the retrieved data to NIC 262, and NIC 262 may generate and issue to one or more network controllers 362 one or more frames (collectively or singly referred to as "frame 31") that may comprise one or more packets (collectively or singly referred to as "packet 30") that may comprise such retrieved data 32 that is intended to be copied into RAID 29. Packet 30 may comply and/or be compatible with the iSCSI Specification.

As part of operation 406, one or more network interface controllers 362 may receive frame 31 and may parse frame 31 to retrieve therefrom data 32. Backup agent 46 may signal backup processes 48. This may result in backup processes 48 signaling operative circuitry 360. This may result, as part of operation 406, in the one or more I/O controllers comprised in operative circuitry 360 exchanging via one or more links 46 data and/or commands with operative circuitry 36 in mass storage 28. As a result, at least in part, of this exchange of data and/or commands via one or more links 46, one or more redundant copies of data 32 may be stored in RAID 29, as part of operation 406.

Conversely, if the at least one I/O transaction and/or operation requested by request 26 is comprised in, facilitates, and/or may be used to carry out, at least in part, a data recovery operation, the signaling by target agent 40A of operative circuitry 260, as part of operation 406, may result in the I/O controller comprised in operative circuitry 260 signaling local storage 228 to store a copy of data 14 from RAID 29. That is, if the at least one I/O transaction and/or operation requested by request 26 is comprised in, facilitates, and/or may be used to carry out, at least in part, a data recovery operation, backup processes 48 and/or backup agent 46 may signal operative circuitry 360. This may result in the I/O controller that may be comprised in operative circuitry 360 to retrieving from RAID 29, as part of operation 402, data 14. Data 14 may comprise data that was previously copied to RAID 29 from, e.g., storage 228, as part of a previously executed data backup operation involving circuitry 34A. This may also result in, as part of operation 402, one or more network interface controllers 362 transmitting data 14 in one or more packets (collectively referred to as "packet 50") in one or more frames (collectively referred to as "frame 49") to NIC 260 via link 20. Request 26 may indicate that data 14 in packet 50 is intended to be copied to storage 228 as part of the data recovery operation requested by request 26.

After NIC 262 receives frame 49, NIC 262 may parse frame 49 and retrieve therefrom data 14. Target agent 40A may signal operative circuitry 260. This may result in the I/O controller comprised in operative circuitry 260 signaling storage 228. This may result in storage 228 storing, as part of operation 406, data 14 in accordance with request 26.

Backup agent 46 and/or backup processes 48 may be programmed to permit data backup and/or recovery operations to be scheduled (e.g., based at least in part upon scheduling commands received by a human user via interface 316) to be performed during non-peak usage times of system 100 (e.g., late at night after close of business). Of course, without departing from this embodiment, backup agent 46 and/or backup processes 48 may permit such operations to be scheduled to be performed during times other than non-peak usage times of system 100.

Operative circuitry 38 also may comprise one or more target agents 44. One or more target agents 44 may be capable of signaling operative circuitry 38 to initiate performance by operative circuitry 38 one or more I/O transactions whose performance may be initiated and/or requested by one or more requests generated by, e.g., one or more respective initiator agents (not shown) in operative circuitry 34A, 34B, . . . 34N, and may be transmitted to operative circuitry 38 via one or more respective wireless communication links in system 100. More specifically, these one or more respective initiator agents may be capable of signaling operative circuitry 34A, 34B, . . . 34N to generate and issue one or more requests initiating and/or requesting the initiation of performance by circuitry 38 of one or more I/O transactions and/or operations that are not of the one or more predetermined types, such as, for example, one or more I/O transactions and/or operations that are not comprised in, and/or used to facilitate or carry out, at least in part, a data backup and/or recovery operation.

In summary, one system comprises a wireless network communication link, first circuitry, and second circuitry remote from the first circuitry. The first circuitry may be capable of issuing to the second circuitry, and/or the second circuitry being capable of receiving, via the link, a request to initiate performance of at least one I/O operation of at least one type involving, at least in part, the second circuitry. The second circuitry may be disabled from initiating performance of any I/O operation of the at least one type involving the first circuitry. In response, at least in part, to receipt of the request, the second circuitry may be capable of performing, at least in part, the at least one I/O operation involving, at least in part, the second circuitry.

Advantageously, these features of this system embodiment permit the coherency and security of a redundant copy of data to be enhanced compared to the prior art. Also advantageously, these features of this system embodiment may permit nodes in the system embodiment to be able to communicate wirelessly when carrying out data backup and/or recovery operations, may reduce the use of network cabling, and may reduce limitations in mobility of nodes in the system embodiment compared to the prior art.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, it is intended that the claims be construed as covering all such modifications.

What is claimed is:

1. An apparatus comprising:
at least one of first circuitry to issue to second circuitry, and the second circuitry to receive, a request to initiate performance by the second circuitry of at least one input/output (I/O) operation of at least one type involving, at least in part, the second circuitry, the second circuitry being remote from the first circuitry and being disabled from initiating performance by the first circuitry of any I/O operation of the at least one type involving the first circuitry, and the second circuitry being capable of performing, at least in part, the at least one I/O operation involving the second circuitry;

the first circuitry begin enabled to initiate the performance by the second circuitry of the at least one I/O operation of the at least one type involving, at least in part, the second circuitry, the at least one type comprising at least one of a data backup operation and a recovery operation;

the apparatus further comprising a wireless communication link capable of transmitting the request from the first circuitry to the second circuitry; and wherein the at least one I/O operation involving, at least in part, the second circuitry comprises at least one of the following:
transmitting from the second circuitry to the first circuitry, via the wireless communication link, first data to be stored remotely from the second circuitry; and
receiving by the second circuitry from the first circuitry, via the wireless communication link, second data retrieved from first storage remote from the second circuitry.

2. The apparatus of claim 1, wherein:
the apparatus further comprises second storage capable of storing the first data prior to the transmitting from the second circuitry to the first circuitry of the first data; and
the apparatus further comprises third circuitry to copy the first data in the first storage.

3. The apparatus of claim 1, wherein:
the apparatus further comprises third circuitry capable of retrieving the second data from the first storage; and
the second circuitry is capable of copying the second data in the second storage after the receiving by the second circuitry from the first circuitry of the second data.

4. The apparatus of claim 1, wherein:
the apparatus comprises the first circuitry and the second circuitry; and
the first circuitry and the second circuitry comprise respective wireless transmission circuitry capable of the at least one of the transmitting of the first data and the receiving of the second data, via the wireless communication link, using a block-based communication protocol.

5. The apparatus of claim 1, wherein:
the second circuitry is capable of executing one or more processes, execution of the one or more processes resulting in the second circuitry being enabled to perform, at least in part, the at least one I/O operation involving, at least in part, the second circuitry, the execution of the one or more processes also resulting in the second circuitry being disabled from initiating the performance of any I/O operation of the at least one type involving the first circuitry.

6. A system comprising:

a wireless network communication link;

first circuitry;

second circuitry remote from the first circuitry; and the first circuitry being capable of issuing to the second circuitry, and the second circuitry being capable of receiving, via the link, a request to initiate performance by the second circuitry of at least one input/output (I/O) operation of at least one type involving, at least in part, the second circuitry, the second circuitry being disabled from initiating performance by the first circuitry of any I/O operation of the at least one type involving the first circuitry, and the second circuitry being capable of performing, at least in part, the at least one I/O operation involving the second circuitry;

the first circuitry being enabled to initiate the performance by the second circuitry of the at least one I/O operation of the at least one type involving, at least in part, the second circuitry, the at least one type comprising at least one of a data backup operation and a recovery operation;

wherein the at least one I/O operation involving, at least in part, the second circuitry comprises at least one of the following:

transmitting from the second circuitry to the first circuitry, via the wireless communication link, first data to be stored remotely from the second circuitry; and receiving by the second circuitry from the first circuitry, via the wireless communication link, second data retrieved from first storage remote from the second circuitry.

7. The system of claim 6, further comprising:

third circuitry capable of accessing first storage in response, at least in part, to a request to perform one of a data backup operation and a data restore operation, the one of the data backup operation and the data restore operation comprising the at least one I/O operation.

8. The system of claim 7, wherein:

the first storage comprises a redundant array of inexpensive disks (RAID);

the system further comprises second storage accessible by the second circuitry;

the data backup operation comprises copying to the RAID first data stored in the second storage; and the data restore operation comprises copying to the second storage second data stored in the RAID.

9. The system of claim 6, wherein:

a client node comprises the second circuitry; and a server node comprises the first circuitry.

10. The system of claim 9, wherein:

the second circuitry comprises an I/O controller coupled to storage and a network interface controller that is capable of communicating with the first circuitry via the link.

11. The system of claim 10, wherein:

at least one circuit card comprises at least one of the I/O controller and the network interface controller;

the second circuitry further comprises at least one circuit card slot; and the at least one circuit card is capable of being coupled to the at least one circuit card slot.

12. A method comprising:

at least one of issuing from first circuitry to second circuitry, and receiving by the second circuitry of, a request to initiate performance by the second circuitry of at least one input/output (I/O) operation of at least one type involving, at least in part, the second circuitry, the second circuitry being remote from the first circuitry and being disabled from initiating performance by the first circuitry of any I/O operation of the at least one type involving the first circuitry, the second circuitry being capable of performing, at least in part, the at least one I/O operation involving the second circuitry;

the first circuitry being enabled to initiate the performance by the second circuitry of the at least one I/O operation of the at least one type involving, at least in part, the second circuitry, the at least one type composing at least one of a data backup operation and a recovery operation;

wherein the issuing of the request comprises transmitting the request from the first circuitry to the second circuitry via a wireless communication link; and wherein the performance of the at least one I/O operation involving, at least in part, the second circuitry comprises at least one of the following:

transmitting from the second circuitry to the first circuitry, via the wireless communication link, first data to be stored remotely from the second circuitry; and receiving by the second circuitry from the first circuitry, via the wireless communication link, second data retrieved from first storage remote from the second circuitry.

13. The method of claim 12, wherein:

prior to the transmitting from the second circuitry to the first circuitry of the first data, the first data is stored in second storage; and the method further comprises, copying, by third circuitry, the first data in the first storage.

14. The method of claim 12, wherein:

the second data is retrieved by third circuitry from the first storage; and the method further comprises:

after the receiving by the second circuitry from the first circuitry of the second data, copying, by the second circuitry, the second data in the second storage.

15. The method of claim 12, wherein:

the at least one of the transmitting of the first data and the receiving of the second data comprises using a block-based communication protocol.

16. The method of claim 12, further comprising:

executing one or more processes, execution of the one or more processes resulting in the second circuitry being enabled to perform, at least in part, the at least one I/O operation involving, at least in part, the second circuitry, the execution of the one or more processes also resulting in the second circuitry being disabled from initiating the performance of any I/O operation of the at least one type involving the first circuitry.

17. An article comprising:

a storage medium having stored thereon instructions that when executed by a machine result in the following:

at least one of issuing from first circuitry to second circuitry, and receiving by the second circuitry of, a request to initiate performance by the second circuitry of at least one input/output (I/O) operation of at least one type involving, at least in part, the second circuitry, the second circuitry being remote from the first circuitry and being disabled from initiating performance by the first circuitry of any I/O operation of the at least one type involving the first circuitry, the second circuitry being capable of performing, at least in part, the at least one I/O operation involving the second circuitry;

the first circuitry being enabled to initiate the performance by the second circuitry of the at least one I/O operation of the at least one type involving, at least in part, the second circuitry, the at least one type comprising at least one of a data backup operation and a recovery operation;

wherein the issuing of the request comprises transmitting the request from the first circuitry to the second circuitry via a wireless communication link; and wherein the performance of the at least one I/O operation involving, at least in part, the second circuitry comprises at least one of the following:

transmitting from the second circuitry to the first circuitry, via the wireless communication link, first data to be stored remotely from the second circuitry; and receiving by the second circuitry from the first circuitry, via the wireless communication link, second data retrieved from first storage remote from the second circuitry.

18. The article of claim 17, wherein:

the at least one of the transmitting of the first data and the receiving of the second data comprises using a block-based communication protocol.

19. The article of claim 17, wherein the instructions when executed by the machine also result in:

executing one or more processes, execution of the one or more processes resulting in the second circuitry being enabled to perform, at least in part, the at least one I/O operation involving, at least in part, the second circuitry, the execution of the one or more processes also resulting in the second circuitry being disabled from initiating the performance of any I/O operation of the at least one type involving the first circuitry.

* * * * *